(12) United States Patent
Gossett (10) Patent No.: US 6,208,361 B1
(45) Date of Patent: Mar. 27, 2001

(54) METHOD AND SYSTEM FOR EFFICIENT CONTEXT SWITCHING IN A COMPUTER GRAPHICS SYSTEM

(75) Inventor: Carroll Philip Gossett, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/097,601

(22) Filed: Jun. 15, 1998

(51) Int. Cl.⁷ ...................................................... G06F 13/00
(52) U.S. Cl. ........................ 345/508; 345/506; 345/522; 712/228; 709/108; 710/260
(58) Field of Search .................................. 345/501–503, 345/506, 513, 522, 508; 712/228; 710/260, 264, 267; 709/107, 108

(56) References Cited

U.S. PATENT DOCUMENTS

| | | | |
|---|---|---|---|
| 5,224,210 | * | 6/1993 | Pinedo et al. ........................ 395/501 |
| 5,299,309 | * | 3/1994 | Kuo et al. ............................ 345/512 |
| 5,430,841 | * | 7/1995 | Tamenbaum et al. ............... 345/501 |
| 5,831,637 | * | 11/1998 | Young et al. ......................... 345/501 |
| 5,896,141 | * | 4/1999 | Blaho et al. .......................... 345/512 |
| 5,917,503 | * | 6/1999 | Zakharia et al. ..................... 345/506 |
| 6,058,438 | * | 5/2000 | Diehl et al. ............................ 710/24 |

* cited by examiner

Primary Examiner—Kee M. Tung
(74) Attorney, Agent, or Firm—Wagner, Murabito & Hao LLP (57) ABSTRACT

The present invention comprises a system for implementing efficient context switching in a graphics computer system including a processor subsystem and a graphics pipeline. The system of the present invention includes a graphics pipeline configured to render 3D objects and a processor subsystem coupled to the graphics pipeline for executing a software process. A command buffer is coupled to the graphics pipeline for storing graphics commands from the software process and efficiently providing the graphics commands to the graphics pipeline. A shadow buffer is coupled to the command buffer and the graphics pipeline. The shadow buffer is adapted to store a state of the command buffer such that when the software process executing on the processor subsystem switches context, the shadow buffer implements an efficient context change by providing the state of the command buffer to the software process.

17 Claims, 5 Drawing Sheets

METHOD AND SYSTEM FOR EFFICIENT CONTEXT SWITCHING IN A COMPUTER GRAPHICS SYSTEM

FIELD OF THE INVENTION

The field of the present invention pertains to computer implemented graphics. More particularly, the present invention relates to a system and method for context switching in a computer graphics system.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices.

Graphics have also become a key technology for communicating ideas, data, and trends in most areas of commerce, science, and education. Until recently, real time user interaction with three dimensional (3D) models and pseudo-realistic images was feasible on only very high performance workstations. These workstations contain dedicated, special purpose graphics hardware. The progress of semiconductor fabrication technology has made it possible to do real time 3D animation, with color shaded images of complex objects, described by thousands of polygons, on powerful dedicated rendering subsystems. The most recent and most powerful workstations are capable of rendering completely life-like, realistically lighted, 3D objects and structures.

In a typical 3D computer generated object, the surfaces of the 3D object are described by data models. These data models store "primitives" (usually mathematically described polygons and polyhedra) that define the shape of the object, the object attributes, and the connectivity and positioning data describing how the objects fit together. The component polygons and polyhedra connect at common edges defined in terms of common vertices and enclosed volumes. The polygons are textured, Z-buffered, and shaded onto an array of pixels, creating a realistic 3D image.

In a typical graphics computer, most of the actual rendering computation is performed by a graphics subsystem included in the graphics computer. The 3D object data models are "traversed" by a software program (e.g., in response to user input) running on one or more processors in a processor subsystem within the graphics computer. The primitives describing the 3D object are processed by the processor subsystem and sent to the graphics subsystem for rendering. For example, a 3D polyhedra model of an object is sent to the graphics subsystem as contiguous strips of polygons, sent to the graphics subsystem as a graphics data stream (e.g., primitives, rendering commands, instructions, etc.). This graphics data stream, sometimes referred to as a command data stream, provides the graphics subsystem with all the information required to render the 3D object and the resulting scene. Such information includes, for example, specular highlighting, anti-aliasing, depth, transparency, and the like. Using this information, the graphics subsystem performs all the computational processing required to realistically render the 3D object. The hardware of the graphics subsystem is specially tuned to perform such processing quickly and efficiently in comparison to the processor subsystem.

To facilitate fast and efficient graphics processing, typical graphics subsystems include a command buffer which "buffers" the incoming command data stream. The command buffer functions as a FIFO (first-in-first-out buffer) for the incoming command data stream, thereby allowing the graphics subsystem to continue functioning nominally in those instances where the command data stream coming from the processor subsystem arrives in "bursts". This enables the graphics subsystem to continue processing the command data stream, and thus, continue its rendering at its nominal rate, even though the command data stream from the processor subsystem is briefly interrupted from time to time.

There exists a problem, however, with regard to context switching. Inside the graphics pipeline of the graphics subsystem, there is a large amount of "rendering state" maintained in the hardware of the pipeline at any given time. The rendering state is typically comprised of the graphics commands and data which describe the lighting parameters, textures, primitives, matrices, modes, etc., required to render a scene. Typically, the more complex the rendering process, e.g., the more realistic and more detailed the rendering process, the larger the rendering state. Hence, the rendering state for high performance graphics subsystems can be quite large when all the lighting parameters, matrices, modes, texture memory, and the like are considered. The inclusion of a large command buffer further increases the size of the rendering state.

In contrast, for example, the rendering states for typical 2D scenes are much smaller. In addition to 3D graphics, most graphics computers also extensively use 2D graphics, particularly within a windowing, graphical user interface (e.g., X Windows). These 2D windowing applications usually support multiple 2D "windows" for each process thread running on the processor subsystem. Switching between these 2D windows, e.g., due to some user input, is acceptably fast due to the fact that for typical 2D operations, each rendering process (e.g., for each window) has a very small rendering state in comparison to a typical 3D scene. Hence, even though an application may switch contexts frequently, the setup overhead for the context switching between the 2D windows is small. When the graphics computer runs multiple 3D graphics programs and switches context between them, or when the computer switches between 2D and 3D processes, the setup overhead for the large 3D rendering state(s) is much larger. Accordingly, the graphics computer suffers a large performance penalty when switching context in such situations, especially when the graphics subsystem includes a large command buffer coupled to the graphics pipeline.

Thus, what is required is a method and system which implements efficient context switching in a graphics computer system. What is required is a system which efficiently implements context switching between multiple 3D processes being rendered in a graphics subsystem of the graphics computer. What is further required is a system which does not impose a performance penalty when context switching between processes. In addition, what is required is a system which supports the inclusion of a large command buffer in the graphics subsystem for improved performance without imposing a performance penalty during context switching. The present invention provides a novel solution to the above requirements.

SUMMARY OF THE INVENTION

The present invention provides a method and system which implements efficient context switching in a graphics computer. The system of the present invention efficiently implements context switching between multiple 3D processes being rendered in a graphics subsystem of the graphics computer. The system of the present invention does not impose a performance penalty when context switching between processes. In addition, the system of the present invention supports the inclusion of a large command buffer in the graphics subsystem for improved performance without imposing a performance penalty during context switching.

In one embodiment, the present invention comprises a system for implementing efficient context switching in a graphics computer system including a processor subsystem and a graphics pipeline within a graphics subsystem. The graphics pipeline is configured to render 3D objects and a processor subsystem coupled to the graphics pipeline for executing a software process. A command buffer is coupled to the graphics pipeline for storing graphics commands from the software process and efficiently providing the graphics commands to the graphics pipeline. A shadow buffer is coupled to the command buffer and the graphics pipeline. The shadow buffer is adapted to store a state of the command buffer such that when the software process executing on the processor subsystem switches context, the shadow buffer implements an efficient context change by providing the state of the command buffer to the software process. In this manner, the system of the present invention efficiently implements context switching between multiple software processes for rendering by the graphics pipeline of the graphics computer.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

In the following detailed description of the present invention, a method and system for efficient context switching in a computer graphics system, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical, optical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "transferring" or "reading" or "processing" or "executing" or "storing" or "shadowing" or "buffering" or the like, refer to the action and processes of a computer system (e.g., computer system 400 shown in FIG. 4), or similar data processing device, that manipulates and transforms data represented as physical (electronic) quantities within the computer system's registers and memories into other data similarly represented as physical quantities within the computer system memories or registers or other such information storage, transmission or display devices.

The present invention provides a method and system which implements efficient context switching in a graphics computer. The system of the present invention efficiently implements context switching between multiple 2D or 3D processes being rendered in a graphics subsystem of the graphics computer. The system of the present invention does not impose a performance penalty when context switching between multiple 2D or 3D processes. In addition, the system of the present invention supports the inclusion of a large command buffer in the graphics subsystem for improved performance without imposing a performance penalty during context switching. The present invention and its benefits are further described below.

Figure 1:
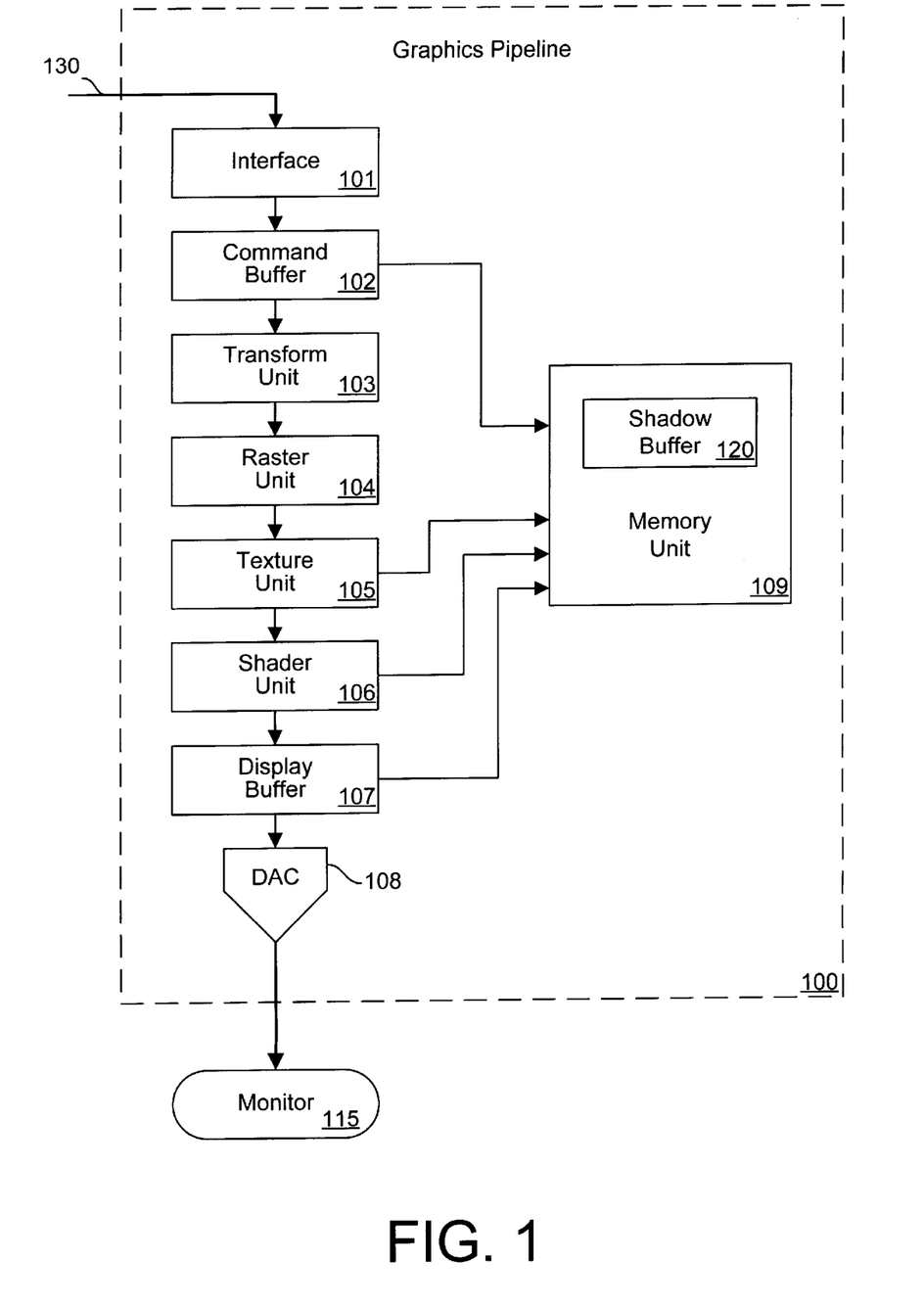
FIG. 1 shows a diagram of a graphics pipeline in accordance one embodiment of the present invention.

Referring now to FIG. 1, a diagram of a graphics pipeline 100 in accordance with one embodiment of the present invention is shown. Graphics pipeline 100 includes the following components: an interface 101; a command buffer 102; a transform unit 103; a raster unit 104; a texture unit 105; a shader unit 106; a display buffer 107; a DAC (digital-to-analog converter) 108; and a memory unit 109. Memory unit 109 includes a shadow buffer 120. Components 101–108 are coupled to receive graphics commands and data (e.g., vertices, and data which describe the lighting parameters, textures, primitives, matrices, modes, etc.), hereinafter referred to simply as graphics commands, from a processor subsystem (not shown) via bus 130. The graphics commands are received in a "stream" and are processed in a super scalar manner by components 101–108.

Graphics pipeline 100 functions by rendering 3D objects described by the command data stream into scenes for display on monitor 115. The 3D objects are described by data models comprised of primitives which define the shape of the object, the object attributes, connectivity and positioning, etc. Components 101–107 of graphics pipeline 100 processes the command data stream, implementing geometry transform functions, rasterization functions, texture mapping, and shading. The resulting pixel data is stored in display buffer 107. This data is converted by DAC 108 to drive the coupled monitor 115, and thus, display the fully rendered 3D image.

To improve speed and efficiency, command buffer 102 is very large in comparison to typical prior art command buffers. Command buffer 102 functions by buffering the incoming command data stream. Command buffer 102 functions as a FIFO (first-in-first-out buffer) for the incoming command data stream, thereby allowing the graphics pipeline 100 to continue functioning nominally in those instances where the command data stream coming from the processor subsystem arrives in bursts. This enables the graphics subsystem to continue processing the command data stream, and thus, continue its rendering at its nominal rate, even though the command data stream may be briefly interrupted from time to time.

Referring still to FIG. 1, in addition to command buffer 102, graphics pipeline 100 includes additional buffers for texture unit 105, shader unit 106, and display buffer 107. In the present embodiment, each of these buffers are implemented in a unified memory unit 109. Memory unit 109 is typically implemented using high speed memory (e.g., SDRAM) having a very high data transfer bandwidth (e.g., greater than 8 GB per second). In accordance with the present invention, memory unit 109 also implements a shadow buffer 120. Shadow buffer 120 functions by greatly improving the speed and efficiency of context switching for graphics pipeline 100.

Context switching refers to the process of switching between software processes executing on the processor subsystem. Each software process spawns its own command data stream for rendering on 3D pipeline 100. Switching between processes involves "reloading" the super-scalar 3D graphics pipeline 100 with a new command data stream from the new process, and saving the current command data stream for the current process for later resumption of rendering. This is often referred to as saving the current rendering state of 3D graphics pipeline 300, and loading a new rendering state.

Context switching between software processes with large rendering states (e.g., complex 3D modeling processes) involves a large amount of overhead. In the present embodiment, these large rendering states are made even larger due to the fact that command buffer 102 is exceptionally large. Consequently, saving a current rendering state can involve "reading back" (e.g., transmitting via bus 130) and saving a large amount of data. The current rendering state of graphics pipeline 100 is read back to the processor subsystem, which in turn, saves the current rendering state in memory. The command data stream from the new software process is subsequently received via bus 130, delivering the new rendering state to graphics pipeline 100. This new rendering state is then processed and displayed on monitor 115.

When the computer system context switches back to the "original" software process, the process is repeated, except that the original rendering state is fetched from memory and transmitted back to graphics pipeline 100 for resumption. The shadow buffer 120 of the present invention functions by efficiently implementing the read back of the current rendering state of graphics pipeline 100. Hence, even though the current rendering state may be exceptionally large (e.g., due to the large size of command buffer 102), state read back occurs quickly and efficiently. Shadow buffer 120, in accordance with the present invention, eliminates the performance penalty associated with context switching, thereby making the presence of the large command buffer 102 transparent. In so doing, shadow buffer 120 greatly improves the context switching speed, and thus the overall speed and responsiveness, of the entire computer system.

Figure 2:
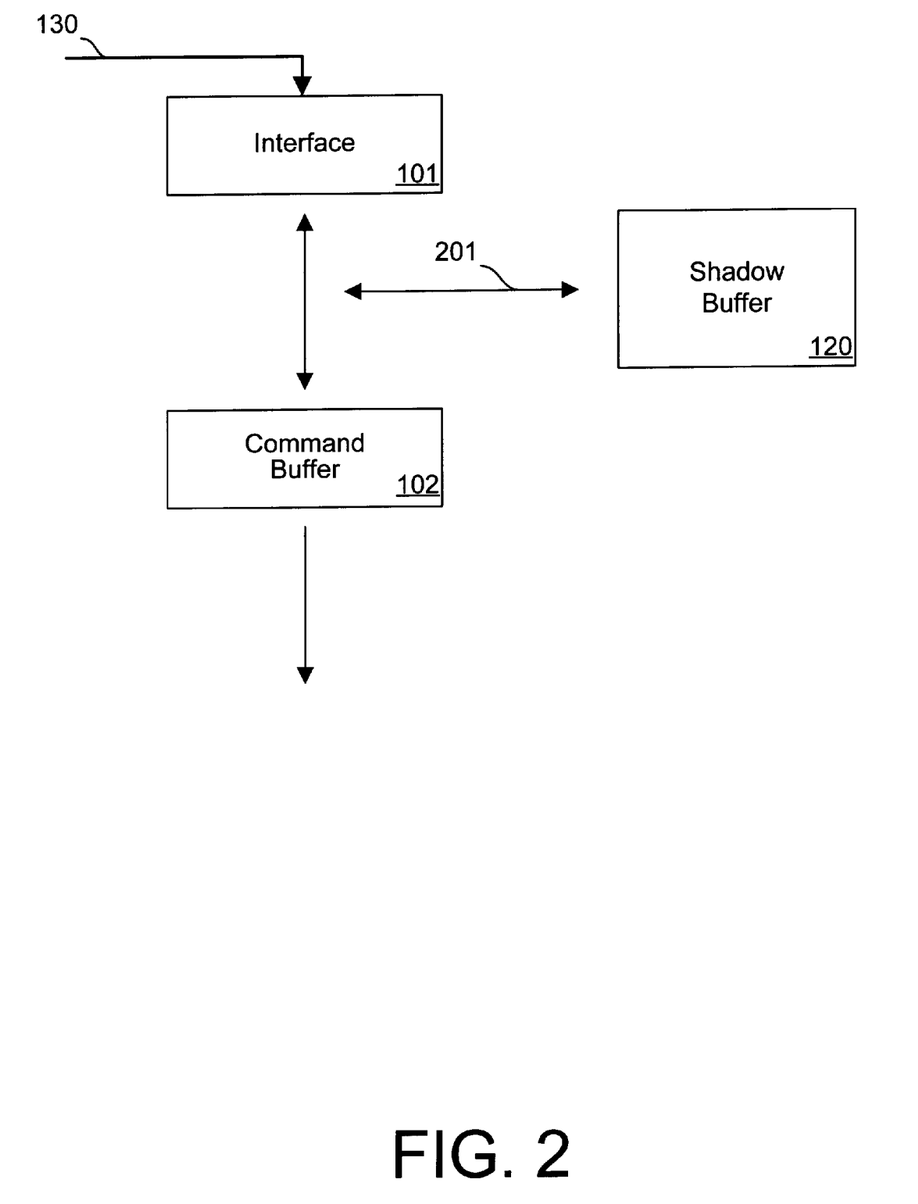
FIG. 2 shows a diagram of the interaction between an interface, a command buffer, and a shadow buffer in accordance with one embodiment of the present invention.

FIG. 2 shows a diagram of the interaction between interface 101, command buffer 102 and shadow buffer 120. As described above, graphics commands are received by the interface 101 from the processor subsystem via bus 130. The graphics commands are subsequently sent from interface 101 to command buffer 102 for buffering. Command buffer 102 functions as a FIFO, to provide a continuous supply of graphics commands to the remaining components of graphics pipeline 100 (e.g., components 103–108). Shadow buffer 120 is coupled to receive the graphics commands as they are received by command buffer 102.

Shadow buffer 120 is adapted for very fast and efficient access. In so doing, shadow buffer 120 is able to efficiently "shadow" the state of command buffer 102. In addition, shadow buffer 120 is coupled to interface 101 via a very high bandwidth connection 201. Thus, when a context switch occurs, the current rendering state can be quickly read back from shadow buffer 120, without having to wait for the contents of the command buffer to drain through graphics pipeline 100. Even though the rendering state may be very large, shadow buffer 120 reads back the current rendering state via high bandwidth connection 201 and interface 101 with much less delay than possible in the prior art.

Figure 3:
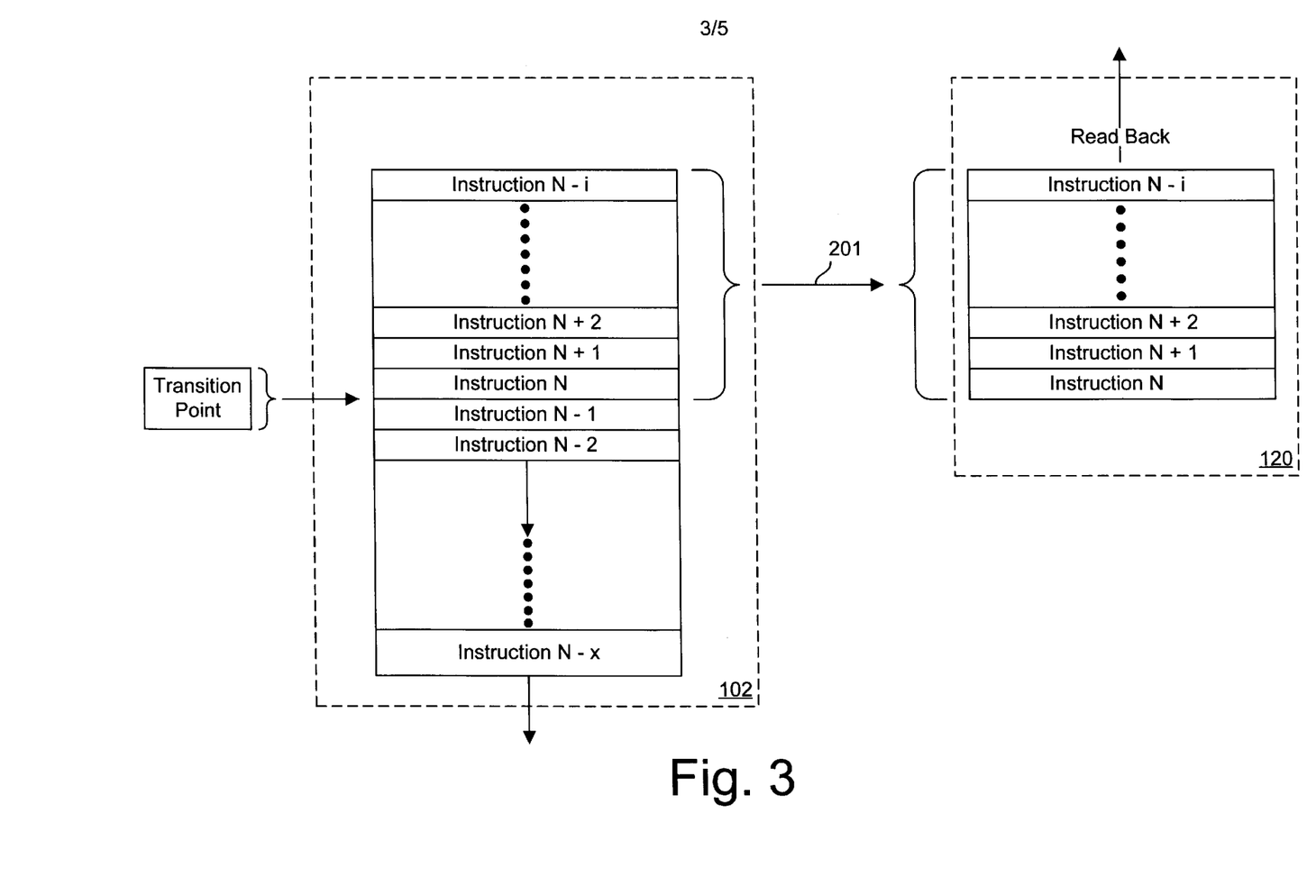
FIG. 3 shows a more detailed diagram of the relationship between the command buffer and the shadow buffer from FIG. 2.

Referring now to FIG. 3, a diagram of the relationship between command buffer 102 and shadow buffer 120 is shown. Command buffer 102 is shown containing a plurality of instructions, from instruction N–x to instruction N+i. Shadow buffer 120 is shown containing the state of the plurality of instructions in command buffer 102.

As described above, shadow buffer 120 shadows the state of command buffer 102 such that when a context switch occurs, the current rendering state can be quickly read back from shadow buffer 120. Shadow buffer 120 accomplishes this by storing the most recent portion of the plurality of instructions received by command buffer 102 along with the current state derived from the previous complete commands. This state is stored in shadow buffer 120 in a parallel fashion, as commands are received and as they flow through command buffer 102. As described above, command buffer 102 functions as a FIFO for the graphics commands (e.g., instructions). Thus, as shown in FIG. 3, the latest received instruction (e.g., instruction N+i) is at the top of command buffer 102 and the earliest received instruction (e.g., N–x) is at the bottom. As successive instructions are received, they flow through command buffer 102 from top to bottom. To conserve memory and to speed context switching, once an instruction passes a transition point within command buffer 102, the present invention treats them as having already been rendered with respect to context switching. This effectively divides the graphics commands within the command buffer into two groups: a first, earlier received group which is past the transition point; and a second, later received group which is above the transition point.

Accordingly, shadow buffer 120 need only shadow those instructions above the transition point and the state derived from the commands that have already flowed past the transition point. As successive instructions are received in command buffer 102, they are stored in shadow buffer 120 until they flow past the transition point of command buffer 102. As the stored instructions move past the transition point, they are dropped from shadow buffer 120. Concurrently, state derived from the complete commands flowing past the transition point are also stored in shadow buffer 120. In this manner, shadow buffer continually shadows those instructions above the transition point and the derived state below the transition point, as commands flow through command buffer 102. When a context switch occurs, necessitating a rendering state read back, only those instructions above the transition point, and thus those instructions stored in shadow buffer 120 along with the derived state from commands below the transition point, are read back. Those instructions which are below the transition point continue through graphics pipeline 100 and are rendered.

For example, as shown in FIG. 3, instructions N–x through N–1 have proceeded past the transition point of command buffer 102, while instructions N through N+i have not. Hence, instruction N through instruction N+i are stored in shadow buffer 120. Consequently, in the event of a context switch, instructions N through N+i are read back to the processor subsystem in the manner described above. Instructions N–1 through N–x continue through command buffer 102 and continue through graphics pipeline 100 for rendering.

Figure 4:
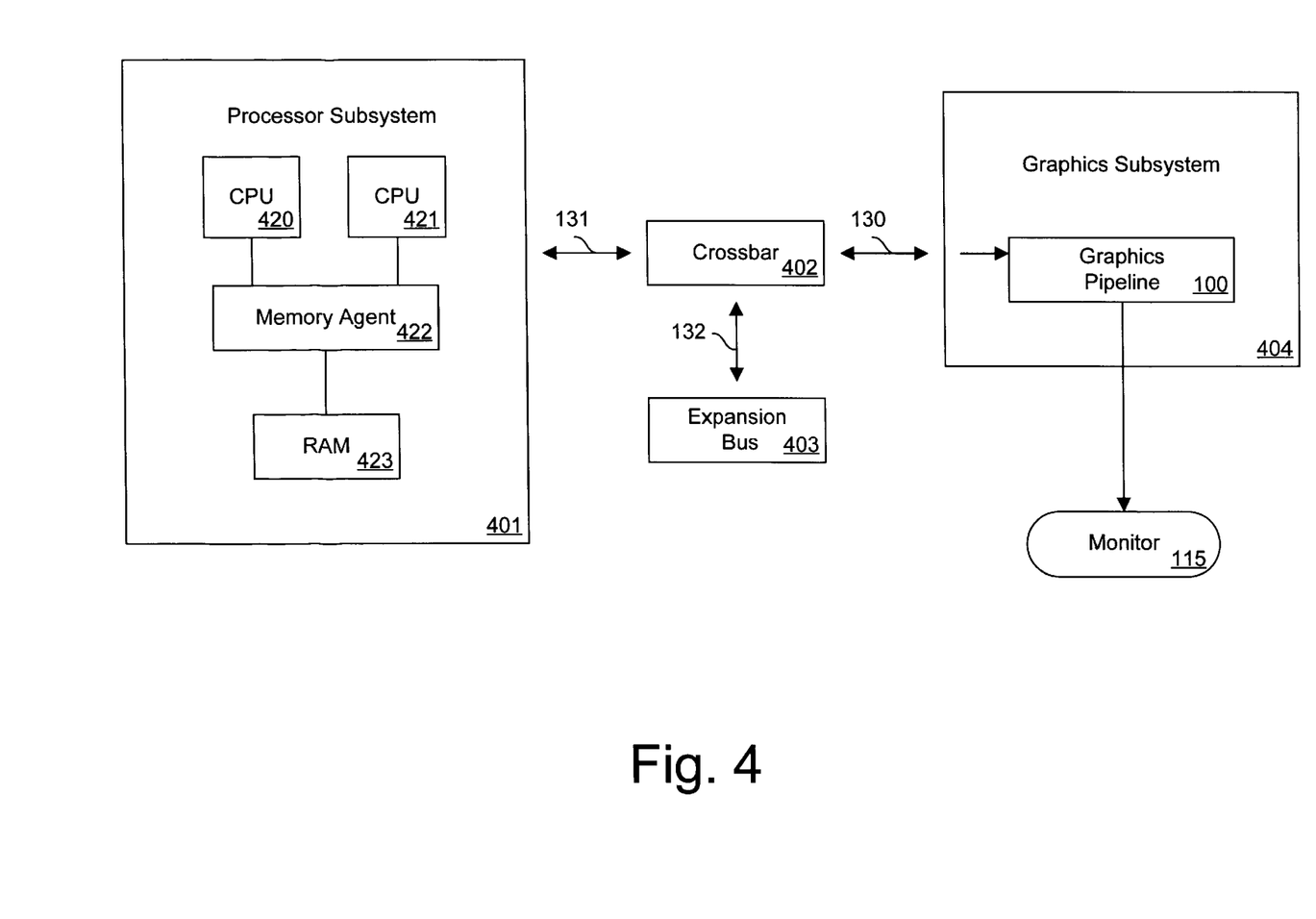
FIG. 4 shows a graphics computer system in accordance with one embodiment of the present invention.

With reference now to FIG. 4, a graphics computer system 400 in accordance with one embodiment of the present invention is shown. Computer system 400 includes a processor subsystem 401, a crossbar switch 402 (hereafter crossbar 402), an expansion bus 403 and a graphics subsystem 404. Processor subsystem 401, expansion bus 403, and graphics subsystem 404 are communicatively coupled via crossbar 402 and busses 130–132. In the present embodiment, processor subsystem 401 includes CPUs (central processing unit) 420 and 421 coupled to a memory agent 422, which is in turn, coupled to a RAM (random access memory) 423. Graphics subsystem 404 includes graphics pipeline 100 from FIG. 1. Graphics pipeline 100 is coupled to monitor 115.

In computer system 400, the majority of the rendering computation is performed by graphics subsystem 404. Processor subsystem 401 primarily functions by hosting one or more software programs which traverse the 3D models. The primitives describing 3D objects are processed and sent to graphics subsystem 404 for rendering. For example, a 3D polyhedra model of an object is sent to graphics subsystem 404 by processor subsystem 401 as a graphics data stream providing all the information required for rendering the 3D scene. Using this information, the graphics subsystem 404 (e.g., graphics pipeline 100) performs all the computational processing required to realistically render the 3D object and the scene, as described above.

It should be appreciated that although computer system 400 is shown including crossbar 402 as opposed to a conventional bus, the present invention is well suited to use with a computer system built around such a conventional bus. Similarly, though computer system 400 is shown having two CPUs 421 and 421, the present invention is well suited to use with computer systems having any number of CPUs. As such, it should be appreciated that the present invention can be readily modified to function with differing computer systems having different configurations as may be suit to a particular contemplated use.

Figure 5:
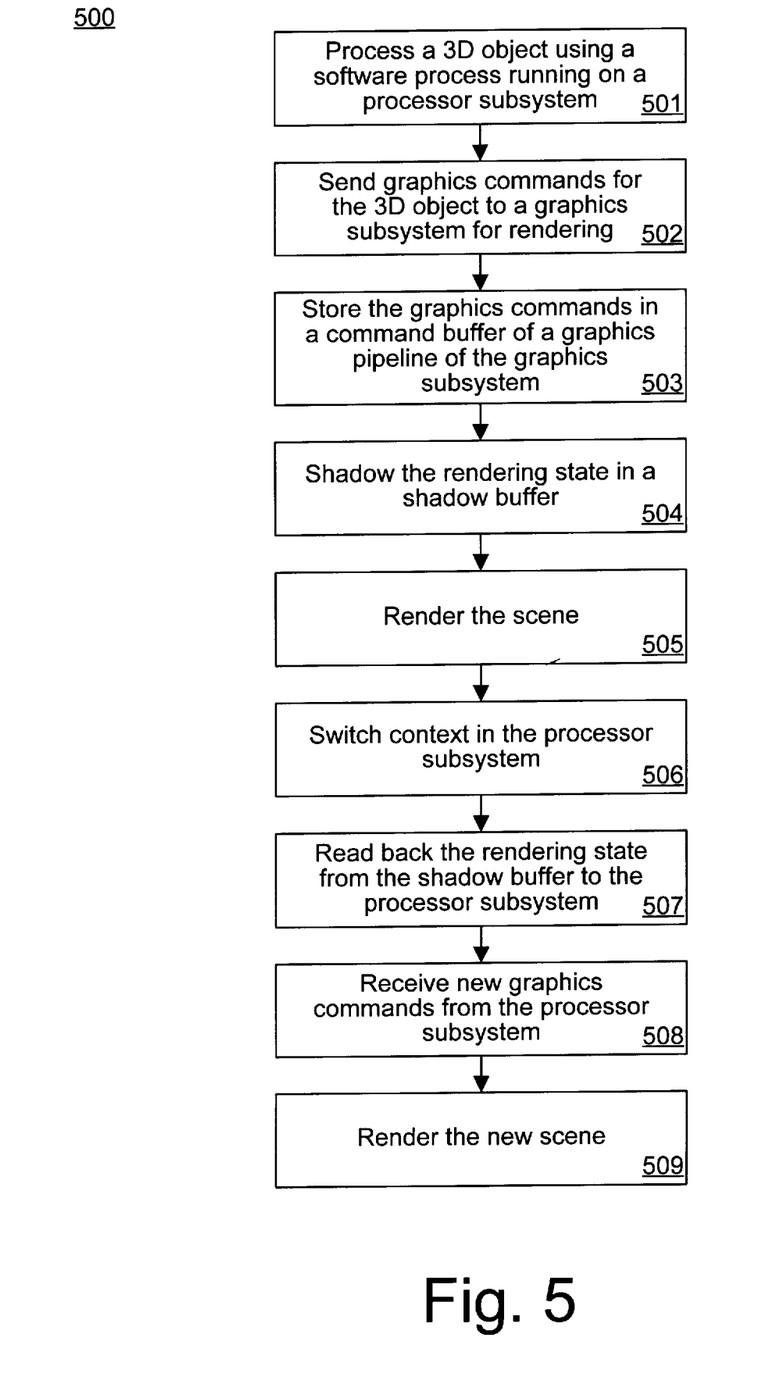
FIG. 5 shows a flow chart of the steps of a process in accordance with one embodiment of the present invention.

With reference now to FIG. 5, a flow chart of the steps of a process 500 in accordance with one embodiment of the present invention is shown. Process 500 depicts a context switching process of a graphics computer system (e.g., computer system 400 from FIG. 4) in accordance with the present invention.

Process 500 begins in step 501, where a 3D object is processed by a software application running on a processor subsystem (e.g., processor subsystem 401). As described above, the 3D object is defined by a data model. The software application or software process manipulates the 3D object by traversing the data model and sending graphics commands to the graphics subsystem.

In step 502, graphics commands for rendering the 3D object are sent to a graphics subsystem (e.g., graphics subsystem 402) for rendering. As described above, the graphics commands include data which define the shape of the object, object attributes, connectivity, lighting, shading, and other such information needed for rendering.

In step 503, the graphics commands are stored in a command buffer of a graphics pipeline (e.g., graphics pipeline 100) included in the graphics subsystem. As described above, the command buffer (e.g., command buffer 102) functions as a FIFO for the incoming graphics commands (e.g., the command data stream). By buffering the command data stream, the command buffer allows the graphics pipeline to continue processing at its nominal rate when the command data stream is briefly interrupted.

In step 504, a shadow buffer (e.g., shadow buffer 120 from FIG. 2) included in the graphics pipeline shadows the rendering state of the graphics pipeline. As described above, the shadow buffer maintains a shadow of the graphics commands in the command buffer and the derived state. These graphics commands and derived state comprise the rendering state of the graphics subsystem (e.g., the graphics pipeline). As described above, the shadow buffer stores those graphics commands which have not flowed "past" a transition point within the command buffer along with the derived state from commands which have flowed past the transition point.

In step 505, the graphics commands of the command data stream are issued from the command buffer to the remaining components of the graphics pipeline for processing (e.g., geometry transformation, rasterization, texture mapping, shading, etc.). The resulting image is then displayed on a coupled monitor (e.g., monitor 115 from FIG. 1).

In step 506, the software application executing on the processor subsystem switches context. For example, where there are multiple software applications running on the computer system, a user selects a window of a different application, having a different 3D scene.

In step 507, to implement the context switch, the rendering state stored in the shadow buffer is read back to the processor subsystem. Those graphics commands above the transition point are read back from the shadow buffer to the processor subsystem, where they are stored in main memory. As described above, the shadow buffer is designed for very high data transfer bandwidth, and is adapted to efficiently provide the rendering state.

In steps 508 and 509, the graphics subsystem receives new graphics commands from the processor subsystem for rendering and the new 3D scene is rendered. The command buffer and the shadow buffer are both refilled with the new graphics commands. The new graphics commands establish a new rendering state and result in a new 3D scene being processed by the graphics pipeline. Consequently, in step 509, the new 3D scene is rendered and displayed on the coupled monitor.

Thus, the present invention provides a method and system which implements efficient context switching in a graphics computer. The system of the present invention efficiently implements context switching between multiple 3D or 2D processes (e.g., software applications) being rendered in a graphics subsystem of the graphics computer. The system of the present invention does not impose a performance penalty when context switching between processes. In addition, the system of the present invention supports the inclusion of a large command buffer in the graphics subsystem for improved performance without imposing a performance penalty during context switching.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a graphics computer system including a processor and a graphics pipeline, a system for implementing efficient context switching, comprising:

a graphics pipeline configured to render 3D objects;

a processor subsystem coupled to the graphics pipeline for executing a software process;

a command buffer coupled to the graphics pipeline for storing graphics commands from the software process and efficiently providing the graphics commands to the graphics pipeline;

a shadow buffer coupled to the graphics pipeline and the command buffer, the shadow buffer for storing the state of the graphics pipeline such that when the software process executing on the processor subsystem switches context, the shadow buffer efficiently implements a context change by providing the state of the graphics pipeline to the software process, wherein the graphics commands stored in the command buffer include a first group of graphics commands and a second group of graphics commands, the first group received prior to the second group such that a transition point exists between the first group and the second group, and wherein the shadow buffer stores the state of the command buffer by storing the second group of graphics commands, and the graphics pipeline state derived from the first group of graphics commands.

2. The system of claim 1, wherein the command buffer stores the graphics commands on a first-in-first-out basis to provide the graphics commands to the graphics pipeline at a nominal rate.

3. The system of claim 1, wherein the shadow buffer stores the rendering state of the graphics pipeline including the state of the command buffer.

4. The system of claim 1, wherein the command buffer is adapted to continually receive and store new graphics commands from the processor on a first-in-first-out basis such that the new graphics commands are included in the second group, causing graphics commands in the second group to move to the first group, and wherein graphics commands in the first group are issued to the graphics pipeline for rendering.

5. The system of claim 4, wherein the shadow buffer is adapted to provide the state of the command buffer by reading back the second group of graphics commands and the graphics pipeline state derived from the first group of graphics commands to the processor.

6. The system of claim 5, wherein the command buffer is configured to continue issuing the graphics commands of the first group to the graphics pipeline after the context change.

7. The system of claim 5, wherein the shadow buffer is configured to have a high data transfer bandwidth to connection to efficiently provide the state of the graphics pipeline to the software process.

8. In a graphics computer system including a processor subsystem having at least one central processor unit and a graphics pipeline having hardware adapted to efficiently render 3D objects, a system for implementing efficient context switching, comprising:

a command buffer coupled to the graphics pipeline for storing graphics commands from a software process executing on the processor subsystem and efficiently providing the graphics commands to the graphics pipeline;

a shadow buffer coupled to the graphics pipeline and the command buffer, the shadow buffer for storing a state of the command buffer such that when the software process executing on the processor subsystem switches context, the shadow buffer efficiently implements a context change by providing the state of the command buffer to the processor subsystem, wherein the graphics commands stored in the command buffer include a first group of graphics commands and a second group of graphics commands, wherein the first group is received prior to the second group such that a transition point exists between the first group and the second group, and wherein the shadow buffer stores the state of the command buffer by storing the second group.

9. The system of claim 8, wherein the command buffer stores the graphics commands on a first-in-first-out basis to provide the graphics commands to the graphics pipeline at a nominal rate.

10. The system of claim 8, wherein the shadow buffer stores a rendering state of the graphics pipeline by storing the state of the command buffer.

11. The system of claim 8, wherein the command buffer is adapted to continually receive and store new graphics commands from the processor subsystem on a first-in-first-out basis such that the new graphics commands are included in the second group, causing graphics commands in the second group to move to the first group, and wherein graphics commands in the first group are issued to the graphics pipeline for rendering.

12. The system of claim 8, wherein the shadow buffer is adapted to provide the state of the command buffer by reading back the second group of graphics commands stored in the shadow buffer to the processor subsystem, and wherein the command buffer is configured to continue issuing the graphics commands of the first group to the graphics pipeline after the context change.

13. The system of claim 8, wherein the shadow buffer is configured to have high data transfer bandwidth to efficiently provide the state of the command buffer to the software process.

14. In a graphics computer system including a processor and a graphics pipeline, a method for implementing efficient context switching, the method comprising the steps of:

a) executing a software process on the processor;

b) rendering a 3D object from the process using a graphics pipeline;

c) storing graphics commands from the process in a command buffer, wherein the graphics commands include a first group of graphics commands and a second group of graphics commands, the first group received prior to the second group such that a transition point exists between the first group and the second group;

d) providing the graphics commands from the command buffer to the graphics pipeline;

e) storing the state of the graphics pipeline in a shadow buffer; and f) implementing a context change by efficiently providing the state of the graphics pipeline to the software process.

15. The method of claim 14, further including the step of storing a rendering state of the graphics pipeline by storing the state of the command buffer.

16. The system of claim 14, further including the step of storing the state of the command buffer by storing the second group of graphics commands in the shadow buffer and the state derived from the first group of graphics commands that have proceeded past the transition point.

17. The method of claim 16, further including the step of providing the state of the graphics pipeline by reading back the second group of graphics commands and the state derived from the first group of graphics commands that have proceeded past the transition point to the software process.

* * * * *